(12) United States Patent
Lee

(10) Patent No.: US 8,344,973 B2
(45) Date of Patent: Jan. 1, 2013

(54) ELECTROSTATIC DISCHARGE PREVENTING APPARATUS FOR LIGHT EMITTING DIODES FOR BACKLIGHTING

(75) Inventor: Jong-Hwae Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1148 days.

(21) Appl. No.: 11/582,230

(22) Filed: Oct. 17, 2006

(65) Prior Publication Data

US 2007/0236443 A1    Oct. 11, 2007

(30) Foreign Application Priority Data

Apr. 5, 2006  (KR) ........................ 10-2006-0031140

(51) Int. Cl.
*G09G 3/36*     (2006.01)
(52) U.S. Cl. .......................................... 345/82
(58) Field of Classification Search ........................ None
See application file for complete search history.

(56) References Cited

U.S. PATENT DOCUMENTS

| 2002/0130786 A1* | 9/2002 | Weindorf | 340/815.45 |
| 2006/0007112 A1* | 1/2006 | Park | 345/102 |

FOREIGN PATENT DOCUMENTS

| JP | 11-354836 | 12/1999 |
| KR | 10-2006-0000601 A | 1/2006 |
| TW | 234027 B | 6/2005 |
| TW | 234425 B | 6/2005 |
| TW | 234679 B | 6/2005 |

OTHER PUBLICATIONS

Office Action issued in corresponding Taiwanese Patent Application No. 095141400; issued Jan. 26, 2010.
Office Action issued in corresponding Korean Patent Application No. 10-2006-0031140; issued Jun. 7, 2012.

* cited by examiner

*Primary Examiner* — Tammy Pham
(74) *Attorney, Agent, or Firm* — Brinks Hofer Gilson & Lione

(57) ABSTRACT

An electrostatic preventing device for light emitting diodes (LED), operative to backlight a liquid crystal display (LCD) device is disclosed. The device includes RGB assemblies installed on a flexible circuit board, and an electrostatic preventing circuit separately installed on the flexible circuit board. The device is adapted to protect RGB LED chips inside each RGB package for backlight, mounted in the RGB assemblies, from static electricity.

11 Claims, 2 Drawing Sheets

ELECTROSTATIC DISCHARGE PREVENTING APPARATUS FOR LIGHT EMITTING DIODES FOR BACKLIGHTING

RELATED APPLICATION

The present disclosure claims priority to Korean Application No. 10-2006-0031140, filed on Apr. 5, 2006, which is herein expressly incorporated by reference in its entirety.

BACKGROUND

1. Technical Field

The present invention relates to an electrostatic discharge preventing device for light emitting diodes (LED) for backlighting a liquid crystal display (LCD). In particular, the invention relates to an electrostatic discharge preventing device in which one electrostatic preventing circuit is provided at one printed circuit board on which LEDs are mounted.

2. Description of the Related Art

An LCD device may display an image by using an optical anisotropy characteristic of a liquid crystal. When light is irradiated onto liquid crystal having a polarized characteristic according to an applied voltage, the liquid crystal is aligned. The LCD device displays an image by controlling an amount of light passing through the liquid crystal according to an aligned state of the liquid crystal.

The LCD device comprises a liquid crystal panel containing liquid crystal between two substrates, and a driving circuit provided at a peripheral portion of the liquid crystal panel for applying a signal to the liquid crystal panel and controlling the signal. Because the liquid crystal panel is not a spontaneous display device, an additional optical source such as a backlight is required.

As a backlight for an LCD TV, a fluorescent lamp may be used. The fluorescent lamp may comprise a direct type and a light guide plate type. Also, a white LED may be used as a backlight for a small LCD device applied to a personal digital assistant (PDA), a portable phone, a notebook, or other mobile devices.

When the LEDs are fabricated, static electricity is generated to be introduced into the LEDs and may damage them. Accordingly, an electrostatic preventing apparatus for protecting LEDs from static electricity is required.

FIG. 1 shows an electrostatic preventing apparatus For LEDs for backlighting in accordance with the related art. As shown, one LED chip 11 is installed on LED package 10 to mute static electricity introduced into the LED chip 11 by a zener diode 12, thereby protecting the LED chip from static electricity.

Recently, an RGB LED chip for backlighting may be applied not only to a PDA, a portable phone, or a notebook, but also to a large display device such as an LCD TV. The RGB LED chip can reproduce more colors than the related art CCFL backlight, and can reproduce colors that are obtained with difficulty by a cathode ray tube (CRT), a plasma display panel (PDP), or a surface conduction electron emitter (SED) display.

FIG. 2 shows an inner structure of an RGB package. As shown, RGB LED chips 21, 22, and 23 are formed in one RGB package 20. A general backlight for an LCD device supplies white light to a liquid crystal panel under a turned-ON state. However, in a Field Sequential Color (FSC) LCD device, the RGB LED chips 21, 22, and 23 are sequentially driven with a period to supply white light to an liquid crystal panel.

When an RGB package for an FSC LCD is fabricated, RGB LED chips have to be installed in a limited space and may cause a difficulty in obtaining a space for installing an electrostatic preventing circuit. Furthermore, when the RGB LED chips are mounted on a surface of a flexible printed circuit board (FPCB), static electricity is generated thus to damage the RGB LED chips and thereby to degrade yield.

SUMMARY

Therefore, an object of the present invention is to provide an electrostatic preventing apparatus for light emitting diodes (LED) for backlighting, the apparatus capable of protecting RGB LED chips inside each RGB assembly from static electricity by additionally installing one electrostatic preventing circuit on at one printed circuit board.

To achieve these and other advantages and in accordance with the purpose of the present invention, as embodied and broadly described herein, there is provided an electrostatic preventing apparatus for light emitting diodes for backlighting, comprising: a plurality of RGB assemblies installed on a flexible printed circuit board (FPCB); and an electrostatic preventing circuit additionally installed on the FPCB for protecting RGB LED chips inside each RGB package for backlighting mounted in the RGB assembly from static electricity.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 3:
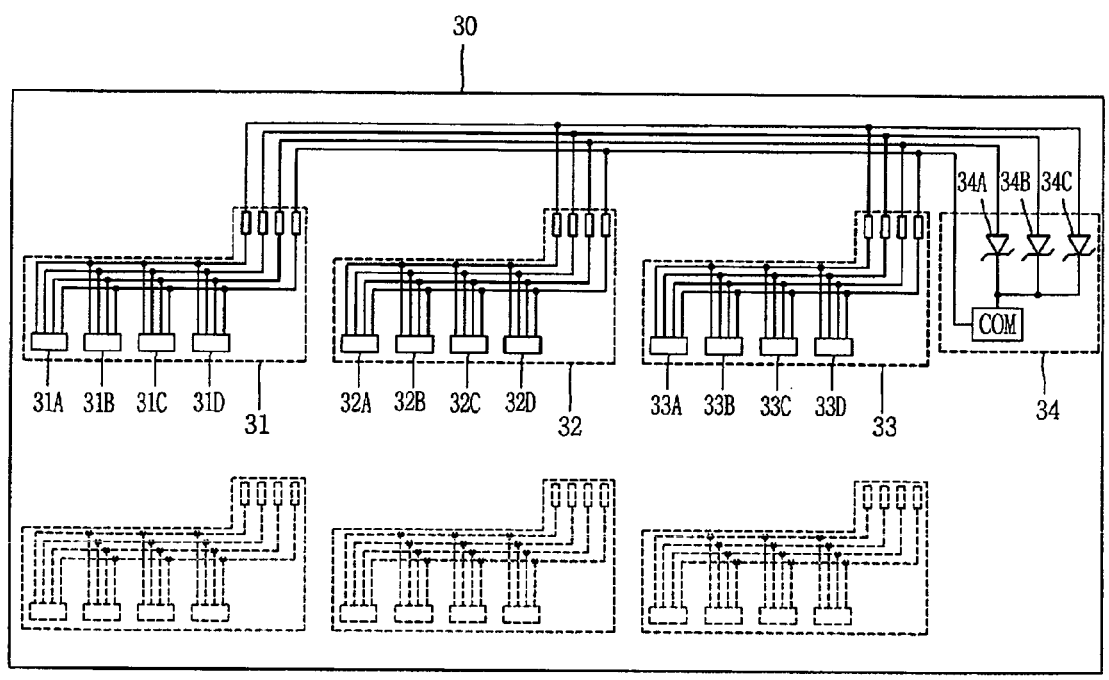
FIG. 3 illustrates a flexible printed circuit board (FPCB) having an electrostatic preventing apparatus for LEDs for backlighting.

FIG. 3 illustrates a flexible printed circuit board (FPCB) having an electrostatic preventing device for LEDs for backlighting.

As shown, an electrostatic preventing device for LEDs for backlighting comprises a plurality of RGB assemblies 31, 32, and 33 mounted on a surface of an FPCB 30 and an electrostatic preventing circuit 34 separately formed from the RFB assemblies 31, 32, and 33 on the FPCB 30, for protecting RGB LED chips (not shown) inside each RGB packages 31A to 31D, 32A to 32D, and 33A to 33D for backlighting mounted at the RGB assemblies 31, 32, and 33 from static electricity.

The RGB assemblies 31, 32, and 33 are provided with a plurality of RGB packages 31A to 31D, 32A to 32D, and 33A to 33D, respectively. The RGB LED chips are respectively mounted in the RGB packages 31A to 31D, 32A to 32D, and 33A to 33D.

The electrostatic preventing circuit 34 is provided with a plurality of zener diodes 34A to 34C that protect the RGB LED chips respectively mounted at the RGB packages 31A to 31D, 32A to 32D, and 33A to 33D from static electricity.

And, an anode of each zener diode 34A to 34C is connected to the RGB LED chip, and a cathode thereof is connected to a common terminal (COM).

An operation of the electrostatic preventing apparatus for RGB LEDs for backlighting will be explained.

The plurality of RGB assemblies 31, 32, and 33 are mounted on a surface of the FPCB 30. The plurality of RGB packages 31A to 31D, 32A to 32D, and 33A to 33D are respectively formed in each of the RGB assemblies 31, 32, and 33.

At least one of the RGB assemblies 31, 32, and 33 is used as a backlight for a terminal such as a personal digital assistant (PDA), a portable phone, a notebook, or other mobile device.

Figure 1:
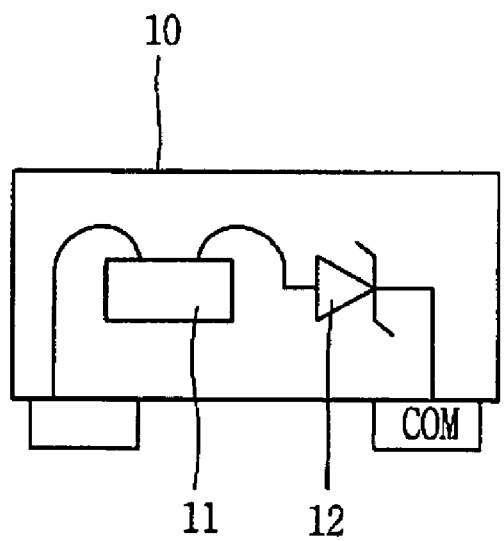
FIG. 1 shows an electrostatic preventing device for light emitting diodes for backlighting in accordance with the related art.
Figure 2:
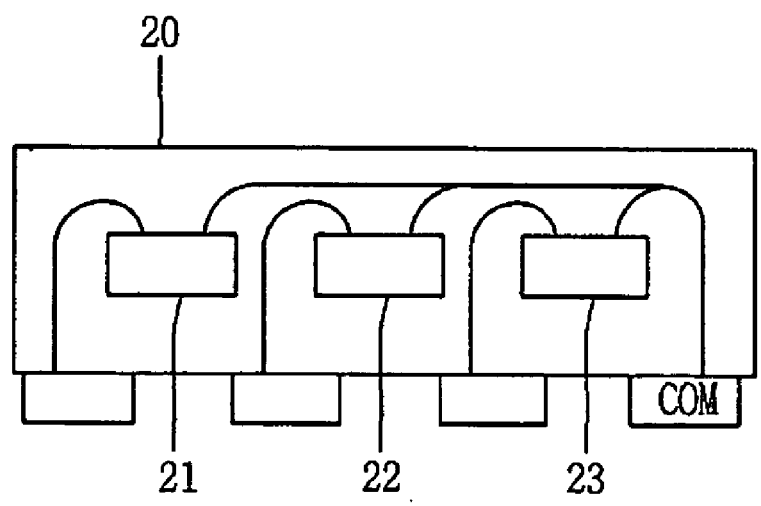
FIG. 2 is an inner structure of an RGB package.

As shown in FIG. 2, RGB LED chips 21, 22, and 23 are respectively formed at the RGB packages 31A to 31D, 32A to 32D, and 33A to 33D. The RGB LED chips 21, 22, and 23 respectively formed at the RGB packages 31A to 31D, 32A to 32D, and 33A to 33D are connected to a common terminal (COM) through zener diodes 34A to 34C of the electrostatic preventing circuit 34.

Static electricity introduced into one of the RGB LED chips 21, 22, and 23 formed at the RGB packages 31A to 31D, 32A to 32D, and 33A to 33D is moderated by a corresponding zener diode of the zener diodes 34A to 34C of the electrostatic preventing circuit 34. Accordingly, the corresponding LED chip is protected from static electricity.

For instance, when static electricity is introduced into the red LED chip 21 of the RGB package 31A of the RGB assembly 31, the static electricity is moderated by the common terminal COM through the zener diode 34C of the electrostatic preventing circuit 34. Accordingly, the red LED chip 21 is protected from static electricity.

When static electricity is introduced into the red LED chip 21 of the RGB assembly 31, the green LED chip 22 of the RGB assembly 32, and the blue LED chip 23 of the RGB assembly 33, the static electricity is moderated by the common terminal COM through the zener diodes 34C, 34B, and 34A of the electrostatic preventing circuit 34. Accordingly, the red LED chip 21, the green LED chip 22, and the blue LED chip 23 are protected from static electricity.

When a plurality of RGB assemblies are mounted in the printed circuit board, an electrostatic preventing circuit is installed in the printed circuit board thus to protect the RGB LED chips mounted in the RGB assemblies from static electricity. Accordingly, the RGB LED chips can be protected from static electricity without having each-electrostatic preventing circuit.

Because each RGB package need not be provided with the electrostatic preventing circuit, spaces for installing the RGB LED chips inside the RGB packages may be obtained.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An electrostatic discharge preventing device for light emitting diodes for backlighting, comprising:
   a plurality of RGB assemblies mounted on a flexible printed circuit board;
   a plurality of RGB packages formed in each RGB assemblies;
   an R LED chip, a G LED chip, and a B LED chip mounted in each of the RGB packages and arranged in parallel;
   an electrostatic discharge preventing circuit having first, second, and third Zener diodes mounted on the flexible printed circuit board to protect the R LED chip, the G LED chip, and the B LED chip inside each RGB packages from static electricity;
   wherein the first, second and third Zener diodes are arranged in parallel with each other;
   wherein the R LED chip of each RGB package is connected to an anode of the first Zener diode, the G LED chip of each RGB package is connected to an anode of the second Zener diode, and the B LED chip of each RGB package is connected to an anode of the third Zener diode; and
   wherein each cathode of the first, second, and third Zener diodes is connected to a common terminal (COM).

2. The device of claim 1, wherein at least one of the RGB assemblies is used as a backlight.

3. The device of claim 1, wherein all of R LED chips are operatively coupled to the common terminal (COM) of the first Zener diode, all of the G LED chips are operatively coupled to the common terminal (COM) of the second Zener diode, and all of the B LED chips are operatively coupled to the common terminal (COM) of the third Zener diode.

4. The device of claim 1, wherein static electricity introduced into any of the R LED chips, the G LED chips, or the B LED chips, is moderated by the corresponding Zener diode of the electrostatic preventing circuit.

5. The device of claim 1, wherein the electrostatic discharge preventing circuit is separate from the plurality of RGB assemblies.

6. The device of claim 1, wherein the electrostatic discharge preventing device is configured for use in an LCD device.

7. The device of claim 6, wherein the LCD device comprises at least one of personal digital assistant, a mobile computer, and a mobile telephone.

8. A method for manufacturing a light emitting diode backlighting device, comprising:
   mounting a plurality of RGB assemblies on a flexible printed circuit board;
   forming a plurality of RGB packages in each of the RGB assemblies, respectively;
   mounting an R LED chip, a G LED chip, and a B LED chip in each of the RGB packages in a parallel arrangement;
   mounting an electrostatic preventing circuit having first, second and third Zener diodes on the flexible printed circuit board, wherein the first, second and third Zener diodes are arranged in parallel with each other;
   connecting the R LED chip of each RGB package to an anode of the first Zener diode, connecting the G LED chip of each RGB package to an anode of the second Zener diode, and connecting the B LED chip of each RGB package to an anode of the third Zener diode, wherein each cathode of the first, second and third Zener diodes is connected to a common terminal (COM); and moderating an electrostatic discharge to the R LED chip, the G LED chip, and the B LED chip by the electrostatic preventing circuit.

9. The method of claim 8, wherein at least one of the RGB assemblies is used as a backlight.

10. The method of claim 8, wherein coupling the RGB assembly comprises coupling the RGB assembly with a surface of the flexible printed circuit board.

11. The method of claim 8, wherein:
the plurality of R LED chips are connected to the common terminal (COM) through only the first Zener diode and are not coupled to the second or the third Zener diodes;
the plurality of G LED chips are connected to the common terminal (COM) through only the second Zener diode and are not coupled to the first or third Zener diode; and
the plurality of B LED chips are connected to the common terminal (COM) through only the third Zener diode and are not coupled to the first or second Zener diode.

* * * * *